United States Patent
Loew et al.

(10) Patent No.: US 7,832,868 B2
(45) Date of Patent: Nov. 16, 2010

(54) METHOD AND ARRANGEMENT FOR DETERMINING THE POSITION OF A TAPE-LIKE MEDIUM

(75) Inventors: Andreas Loew, Gross-Gerau (DE); Kurt-Heiner Philipp, Heppenheim (DE)

(73) Assignee: Thomson Licensing, Boulogne-Billancourt (FR)

( * ) Notice: Subject to any disclaimer, the term of this patent is extended or adjusted under 35 U.S.C. 154(b) by 513 days.

(21) Appl. No.: 11/922,368

(22) PCT Filed: Jun. 1, 2006

(86) PCT No.: PCT/EP2006/062815
§ 371 (c)(1), (2), (4) Date: Dec. 17, 2007

(87) PCT Pub. No.: WO2007/025786
PCT Pub. Date: Mar. 8, 2007

(65) Prior Publication Data
US 2009/0040649 A1 Feb. 12, 2009

(30) Foreign Application Priority Data
Jun. 18, 2005 (DE) .................. 10 2005 028 362

(51) Int. Cl.
*G09B 15/021* (2006.01)
*G03B 1/18* (2006.01)
(52) U.S. Cl. ............... 352/173; 352/174; 352/180; 353/26 A; 242/333.1; 242/333.4; 377/18
(58) Field of Classification Search ............... 353/26 A, 353/26 R; 352/166–197; 360/72.3; 242/333, 242/333.1, 333.4, 334.1; 377/18
See application file for complete search history.

(56) References Cited

U.S. PATENT DOCUMENTS

| | | | | | |
|---|---|---|---|---|---|
| 3,937,927 | A | * | 2/1976 | Weigert ................. | 353/26 A |
| 3,941,978 | A | * | 3/1976 | Huston et al. ............ | 353/26 A |
| 4,200,893 | A | * | 4/1980 | Matison ................. | 360/72.1 |
| 4,277,674 | A | * | 7/1981 | Sato et al. .............. | 377/18 |
| 4,362,259 | A | * | 12/1982 | Stemme et al. ........... | 226/123 |
| 4,385,228 | A | * | 5/1983 | Kanayama et al. ........ | 377/112 |
| 4,806,861 | A | * | 2/1989 | Urayama et al. .......... | 324/212 |
| 4,987,440 | A | * | 1/1991 | Benker et al. ............ | 355/41 |
| 5,175,573 | A | * | 12/1992 | Blaschek et al. .......... | 352/180 |
| 5,208,767 | A | * | 5/1993 | George-Kelso et al. ..... | 377/18 |

OTHER PUBLICATIONS

Search Report Dated Oct. 5, 2006.

* cited by examiner

*Primary Examiner*—William C Dowling
(74) *Attorney, Agent, or Firm*—Robert D. Shedd; Jeffrey M. Navon

(57) ABSTRACT

A method and an arrangement for determining the position of a tape-like medium are proposed. The method provides for counting pulses which are supplied to the arrangement for determining the position to be counted, blocked or cancelled depending on the respective transport state. To this end, it is established whether the transport direction has been constant for a defined amount of time or over a defined distance. The transport direction determines whether the counter is incremented or decremented. In addition, counting pulses which rapidly follow one another are blocked in order to avoid undesirable double triggering. In order to avoid losing blocked counting pulses in an undesirable manner, the latter are stored and are applied to the counter, or discarded, depending on the transport state before and after blocking.

10 Claims, 2 Drawing Sheets

METHOD AND ARRANGEMENT FOR DETERMINING THE POSITION OF A TAPE-LIKE MEDIUM

This application claims the benefit, under 35 U.S.C. §365 of International Application PCT/EP2006/062815, filed Jun. 1, 2006, which was published in accordance with PCT Article 21(2) on Mar. 8, 2007 in English and which claims the benefit of German patent application No. 102005028362.4, filed Jun. 18, 2005.

Successive regions which are to be counted are arranged on a tape-like medium. The tape-like medium is, for example, a cinematographic film and the regions are, for example, film images on said medium. In order to improve understanding of the description, the terms tape-like medium and film and region and film image are used synonymously in the text below. In order to be able to access individual film images in a controlled manner, an image counter must count the film images as the film is being transported. In the sense of the invention, transport is to be understood as meaning, for example, the operation of spooling the film to and fro in a film projector or a film scanner. In film projectors or film scanners, an image pulse which is supplied to the image counter is triggered, for example, at the boundary between two film images. In addition, a direction signal which indicates the counting direction and corresponds to the transport direction is supplied to the image counter. The image counter can thus be incremented or decremented correctly.

Under certain circumstances, the transport direction may change between two successive images. In this case, two image pulses which rapidly follow one another (one for the forward direction and one for the reverse direction) are generated. The temporal interval between the pulses depends on the position at which the change in direction took place, relative to the boundary between two images. Since the interval between two such image pulses can become arbitrarily short, the image counter may not detect one of the two image pulses correctly. This may be the case, for example, if a dead time is provided in the counting mechanism in order to avoid undesirable double triggering. If one of the image pulses was not detected correctly, this results in undesirable incorrect positioning of the film. The counting error impairs, as an offset, the positioning of all further film images.

The above-described occurrence of two image pulses which rapidly follow one another may also be caused by fluctuations during the film transport. In this case, the detection of the film transport direction, for example, may indicate a change without the direction actually having been reversed. An error in the detection of the film transport direction, said error occurring at the boundary between two film images, gives rise to counting in the wrong direction.

In the case of apparatuses which are known from the prior art and are intended to transport film, the above-described undesirable behaviour is avoided by tape transport being deliberately slowed down in the event of a change in direction so that the direction changes in the middle of a film image. However, the known method requires the transport apparatus to be driven in a complicated and intricate manner.

It is therefore desirable to obtain a method and an arrangement for positioning tape-like media, which have increased protection against incorrect positioning in comparison with the prior art. In addition, it is desirable to simplify driving of the transport apparatus.

Such a method is specified in Patent Claim 1. The apparatus specified in Patent Claim 6 achieves another part of the object. Advantageous refinements and developments are specified in the subclaims.

The method according to the invention provides for the transport direction of the film to be detected. In this case, a distinction is made between three different transport states: forward, reverse and undefined. In addition, a signal which indicates that the transport direction is unchanged is generated. This is useful, for example, if film transport is interrupted and is effected later in the same direction. In addition, a counting signal, preferably a counting pulse which increments or decrements an image counter or does not count depending on the transport state, is generated for each image. A counting pulse is generated by combining a transport state with an image pulse. There are three possible situations for generating image counting pulses:

a) An image pulse is applied to the arrangement for determining the position while the film transport direction is defined and stable and remains stable over a defined distance of the transported film.

b) An image pulse is applied to the arrangement for determining the position while the film transport direction is defined and stable. The film transport direction is changed or undefined within a defined distance of the transported film after the image pulse.

c) An image pulse is applied to the arrangement for determining the position while the film transport direction is undefined.

In case a), the image pulses are applied as counting pulses to the image counter and, depending on the transport direction, cause the image counter to be incremented or decremented.

In case b), the image pulse is passed, as in case a), as a counting pulse to the image counter. If the transport direction is then reversed, an image pulse is again applied to the arrangement within a very small amount of time, for example because the boundary between two images is crossed again. The direction signal first of all indicates an undefined transport direction because the transport distance does not suffice to generate a stable direction signal. In the case of an undefined direction, the image pulse is not passed to the image counter and the latter cannot count the image pulse in the reverse transport direction as required. The image counter then displays an incorrect counter reading. For this case, said image pulse is first of all buffer-stored. When the direction signal can be generated in a stable manner again, it is compared with the transport direction which existed before the undefined state. The transport direction is respectively stored for this purpose. If the direction is opposite to the previous transport direction, the stored image pulse is applied as a counting pulse to the image counter. However, since the direction is now reversed, the counting direction of the image counter is also correspondingly reversed. The previously counted image pulse is thus cancelled.

In case c), the image pulse is first of all buffer-stored. When the transport direction is defined again and is also unchanged with respect to the transport direction before the direction signal indicated an undefined transport direction, the buffer-stored image pulse is applied as a counting pulse to the image counter.

The term "logic" is used, in this description, in the sense of binary switching logic, unless expressly indicated otherwise. Instead of the designations "0" and "1" for the logic states, the text below also uses the corresponding terms "low" and "high". The counter provided for the purpose of determining the position of the tape-like medium is a binary counter, for example. The counter which is also referred to as an image counter indicates, for example, the position of the film in the form of the serial number of successive film images.

The invention will be described below with reference to the drawing, in which

In the figures, identical or similar elements have been provided with the same reference symbols.

Figure 1:
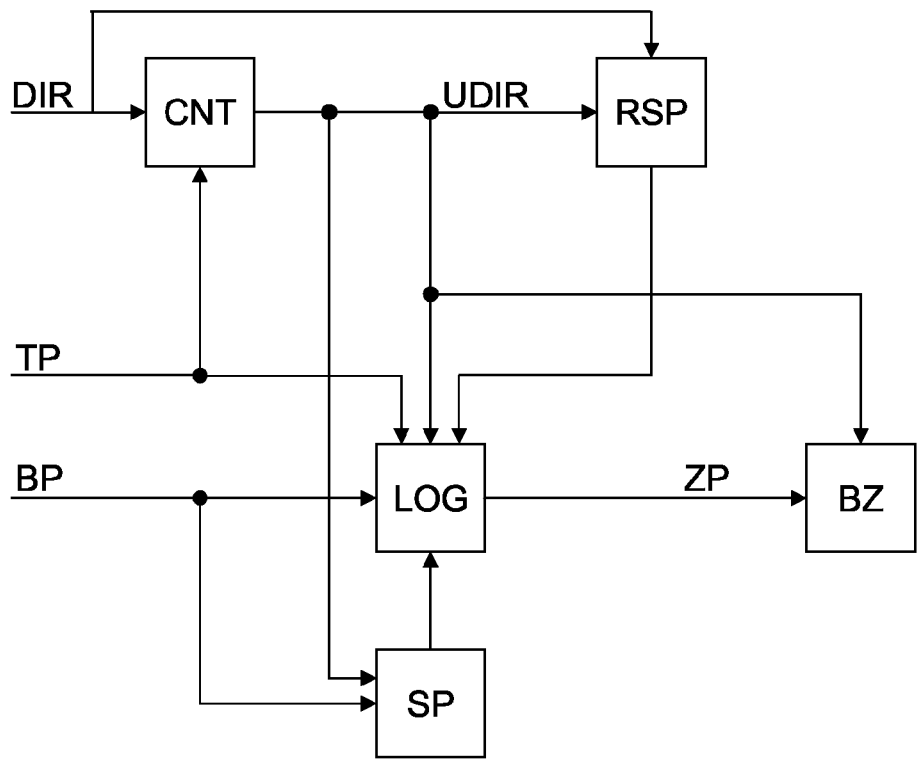
FIG. 1 shows a simplified block diagram of the apparatus according to the invention.

FIG. 1 shows a simplified block diagram of the apparatus according to the invention. Transport pulses TP are applied to a logic circuit LOG and to a counter CNT. A direction signal DIR is also supplied to the counter CNT. The direction signal DIR indicates whether transport is being effected in the forward or reverse direction; it is supplied to the counter CNT in the form of a reset signal in such a manner that a change in the transport direction resets the counter. When the counter CNT has counted a defined number of transport pulses without the direction signal DIR having changed its value, a signal UDIR is present at the output of the counter CNT. The signal UDIR indicates an unambiguous or undefined transport direction and, if appropriate, indicates that the transport direction has not changed for a defined number of transport pulses TP. The signal UDIR and the direction signal DIR are supplied to a direction memory RSP in order to be stored. Said memory stores the state of the signal DIR when UDIR signals an unambiguous transport direction. The output signal from the direction memory RSP and the signal UDIR are supplied to the logic circuit LOG. Image pulses BP which signal the transport of the tape-like medium by a defined multiple of transport pulses TP are applied to the logic circuit LOG. If the tape-like medium is a cinematographic film, the image pulses BP signal, for example, transport by one film image. The image pulses BP are also applied to a memory SP which is also supplied with the signal UDIR. The memory SP stores an image pulse BP, which is supplied to the circuit, when the signal UDIR signals an unknown or undefined transport direction. The logic circuit LOG combines the signals which have been applied to it to form counting pulses ZP. In this case, image pulses BP which are applied to the circuit in the case of a known constant transport direction are directly applied as counting pulses ZP to the image counter BZ. The logic circuit LOG blocks the forwarding of image pulses BP to the image counter BZ for a small amount of time or over a short distance after an image pulse BP has been forwarded as a counting pulse ZP to the image counter. Image pulses BP which are applied to the circuit when the transport direction is unknown or undefined are first of all buffer-stored in the memory SP. An undefined transport direction may occur, for example, if film transport has been interrupted and is then continued again. Since the transport pulses TP are generated even in the case of very small movements of the film, even a slight undesirable or unintended movement of the film, as may be caused by vibrations of the transport device, may trigger a transport pulse TP for the respective opposite direction. A change in direction would thus be incorrectly detected. When the transport direction is known and constant again, a stored image pulse BP is then applied to the image counter BZ if the transport direction is unchanged. If an image pulse BP is passed to the circuit shortly before the transport direction changes, the logic circuit LOG generates a counting pulse ZP which cancels the counting pulse ZP applied before the change in direction, in case the image pulse BP applied to the circuit after the change in direction has been blocked on account of the change in the transport direction.

Figure 2:
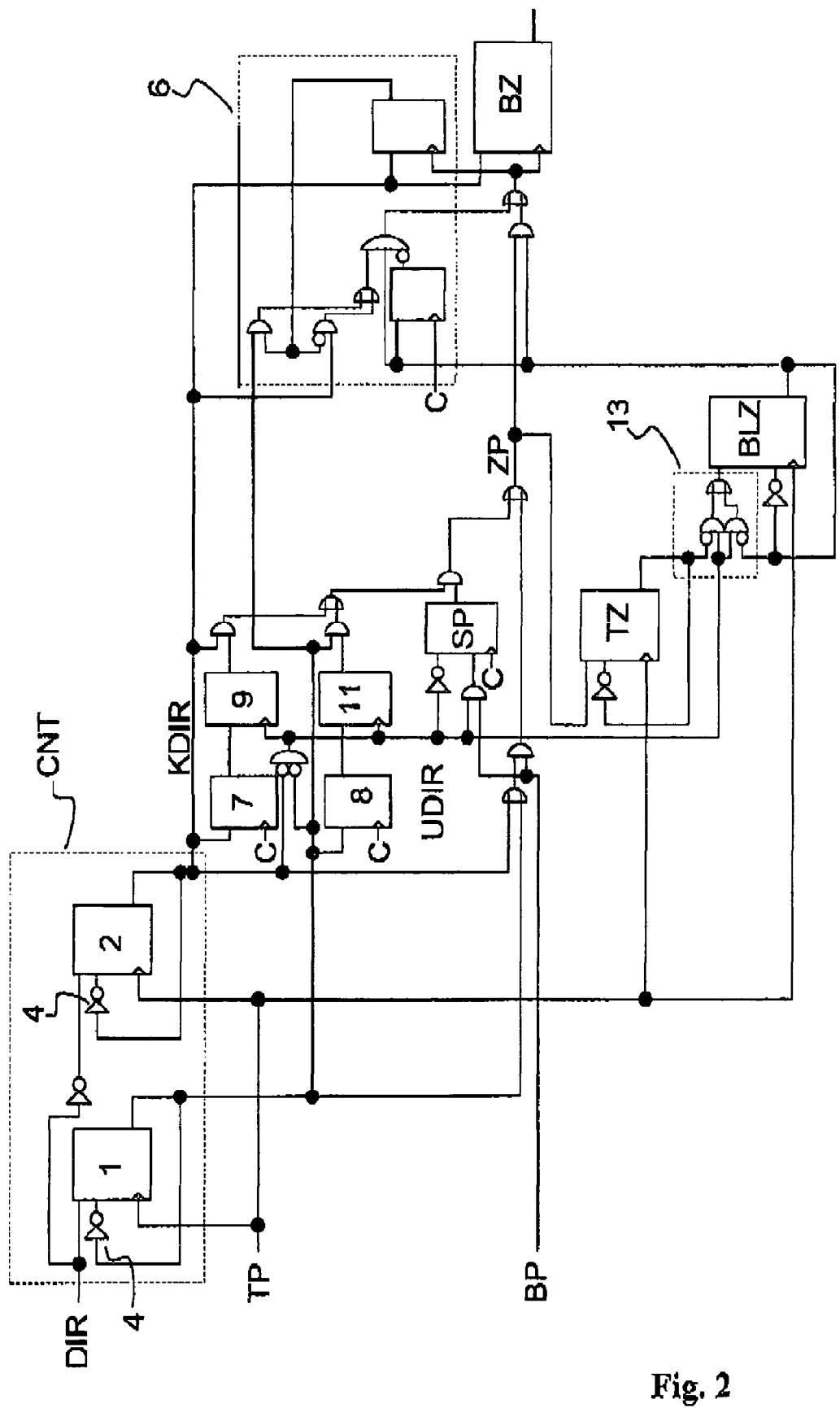
FIG. 2 shows exemplary switching logic for carrying out the method.

FIG. 2 illustrates exemplary switching logic for carrying out the method according to the invention. In one preferred embodiment of the method according to the invention, a detector generates transport pulses TP which correspond to the transport of the tape-like medium over a defined distance. The detector is, for example, a roller which is in non-slip contact with the film and has markings which are made on it at fixed intervals and are evaluated by a sensor. The signals generated by the detector are referred to as transport pulses TP in this example because pulsed signals may be advantageously used for counting. A signal DIR which indicates the transport direction is derived from the transport pulses TP from the detector. The signal DIR may assume, for example, logic "0" and "1" states, each of the logic states representing a transport direction. The signal DIR is supplied as a reset signal to a first counter 1 and to a second counter 2, the signal DIR being applied to one of the counters in inverted form. An inverter 3 is provided for this purpose. The generation of the signal DIR is known from the prior art, for example from rotary encoders. In the case of the latter, the respective combination of states or edge changes of two sequences of alternating logic "0" and "1" states can be used to unambiguously determine the direction of rotation, said sequences being arranged such that they are offset with respect to one another. An active reset signal in the respective counter prevents the latter from beginning to count as a result of clock pulses at its clock input. The transport pulses TP are also supplied to the corresponding clock inputs of the first and second counters 1, 2. The transport pulses TP are generated by the detector in a known manner. For each transport pulse TP, that counter of the two counters which is not kept in the reset state by the signal DIR is incremented by one. The counter which is not kept in the reset state is the active counter. If the transport direction indicated by the signal DIR has remained constant during counting, an unambiguous signal, for example a logic "1", is then applied to a corresponding output of the active counter as soon as the counter has counted to a predetermined value. The output signal from each counter is also connected to an activation input of the same counter and stops this counter as soon as the counter has counted to the predetermined value. In the example shown in FIG. 2, the output signal is respectively applied to the corresponding activation input via an inverter 4. As long as none of the counters 1, 2 has counted to the predetermined value without interruption, a logic "0" is applied to the outputs of both counters 1, 2. As a result of the connection to the signal DIR and to the inverted signal DIR, respectively, one of the counters counts transport pulses TP which correspond to the "forward" transport direction. The other counter counts transport pulses TP which correspond to the "reverse" transport direction. The counters 1, 2 ensure that a change in the transport direction is detected and is taken into account during the counting of the image pulses BP and the associated determination of the position of the tape-like medium.

The output signals from the first and second counters 1, 2 indicate the transport direction of the tape-like medium or indicate that the transport direction has changed. Since only two states are required, it is sufficient to use only the output signal from one counter to determine the counting direction of the image counter BZ. In this example the output is taken from counter 2. The output signal from the counter 2 indicates that the transport direction has been constant for a defined number of transport pulses. It is designated KDIR in the text below. In the event of the transport direction changing, the previously active counter is reset and the reset signal at the previously inactive counter is cancelled. As a result, a logic "0" is first of all applied to the outputs of both counters 1, 2 until the now active counter has counted to the predetermined value and applies a logic "1" to its output. The logic "0" at the outputs of the counters indicates that the transport direction is still undefined after an actual change in direction or an incorrectly detected change in direction. Inverting and subsequently logically ORing the output signals from the two counters 1, 2 generates the signal UDIR which uses a logic "high" level to indicate that the transport direction is not yet constant.

A further signal, preferably a pulse signal, which respectively indicates the transport of the film over a distance that corresponds to the length of one film image, is supplied to the circuit. The further signal which is in the following referred to as an image pulse BP is logically combined with the output signals from the first and second counters 1, 2 and with the transport pulses TP in such a manner that the image counter BZ receives a counting pulse ZP, which results from the combination operation, only when the transport direction has been known and constant for a defined number of transport pulses TP. The direction signal KDIR which indicates the transport direction of the film is also supplied to the image counter BZ. The direction signal KDIR is used to change over the counting direction of the counter BZ between incrementing and decrementing. In one preferred embodiment of the invention, the direction signal KDIR is derived from the output signals from the first and second counters.

The direction signal KDIR is also linked to a correction pulse circuit 6 in such a manner that a counting pulse ZP which is generated shortly before a change in direction is corrected by means of a counting pulse ZP in the respective other direction, in case the corresponding image pulse BP for the opposite direction is blocked on account of the change in direction which took place shortly beforehand. In this case, the term change in direction is used in the sense of an undefined transport direction.

The signal BP is also supplied to a buffer memory SP. The buffer memory SP buffer-stores an image pulse BP if it arrives while the transport direction is undefined. When the transport direction is known again as the film continues to be transported and is also unchanged with respect to the transport direction before the latter was detected as being undefined, the stored image pulse BP is applied as a counting pulse ZP to the image counter BZ. Otherwise, the stored image pulse BP is discarded.

In one refinement of the invention, the output signals from the first and second counters 1, 2 are respectively applied to a delay element 7, 8. In the example, the delay element is a flip-flop that is triggered by an external clock signal C. The delayed output signals from the counters 1, 2 are respectively passed, from the delay elements 7, 8, to a memory 9, 11. The memories 9, 11 each store the signals applied by the delay elements 7, 8 when the transport direction is undefined. An undefined transport direction is indicated by the signal UDIR assuming a logic "1" level. It is necessary to store the transport direction in order to establish whether the transport direction is the same as before after an undefined state. As described further above, an interruption in transport, for example, may result in the transport direction being detected as being undefined.

If, shortly after an image pulse BP has been forwarded as a counting pulse ZP to the image counter BZ, the transport direction changes, a further counter is reset. This further counter is referred to as a blocking counter BLZ below. The signal UDIR, which indicates an undefined transport direction, the output signal from a dead time counter TZ and one of the outputs of the blocking counter BLZ are supplied to the reset input of the blocking counter BLZ. The signal from the dead time counter TZ will be described in more detail below. The transport pulses TP are supplied to the clock input of the blocking counter BLZ. If the direction is known, the reset input of the blocking counter BLZ is deactivated by correspondingly logically combining in a circuit 13 the signals which are supplied to the reset input, and the blocking counter BLZ counts transport pulses TP up to a predetermined value. The output signal from the blocking counter BLZ is logically combined with the counting pulses ZP in such a manner that they are passed to the image counter BZ only when the transport direction is constant.

The dead time counter TZ is reset after each image pulse BP which is passed to the image counter BZ directly or via the buffer memory SP. The transport pulses TP are supplied to the dead time counter TZ as a clock. As soon as the dead time counter TZ has counted a predetermined number of transport pulses TP, it is stopped. An output signal from the dead time counter TZ is logically combined with the signal UDIR, which indicates an undefined transport direction, in such a manner that it resets the blocking counter BLZ if the transport direction is undefined during the dead time. This prevents further image pulses BP from being directly passed to the image counter BZ. Further, the correction pulse circuit 6 is activated, which, in the case of a change in direction that takes place shortly after an image pulse BP, generates a counting pulse ZP in the opposite direction.

Figure 3:
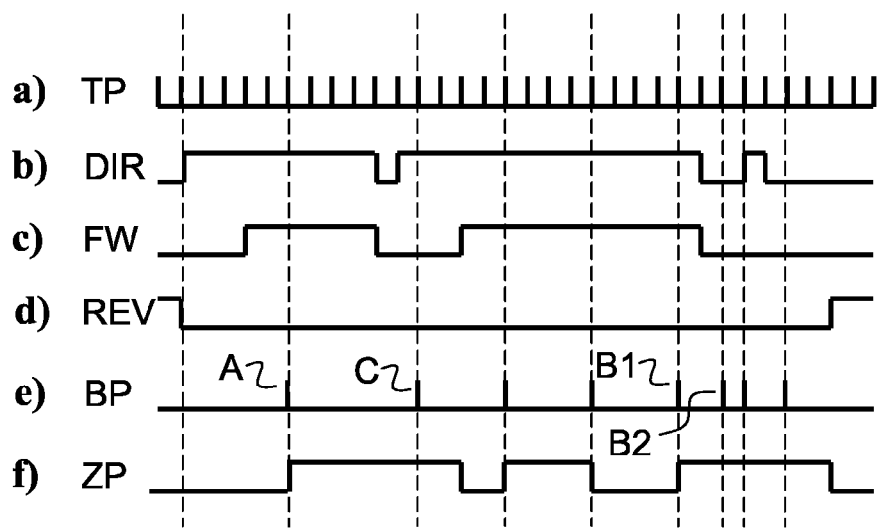
FIG. 3 shows an exemplary diagram of a plurality of transport pulses and the resulting counting pulses for the switching logic shown in FIG. 2.

Line a) in FIG. 3 illustrates a plurality of transport pulses TP. Line b) illustrates the direction signal DIR which indicates whether transport is being effected in the forward or reverse direction. In this case, the respective logic level indicates the transport direction. Line c) shows the output signal from one of the first and second counters, said output signal indicating transport in the forward direction. The delay by three transport pulses TP before the level of the signal FW becomes a logic "high" can be clearly seen. Line d) illustrates the corresponding output signal REV from the other counter, said output signal indicating transport in the reverse direction. The delay before the signal level follows the signal DIR in line b) can also be seen here. Line e) illustrates the image pulses BP which are applied to the circuit. Line f) illustrates the counting pulses ZP which are applied to the image counter. In this case, it shall be assumed that the image counter counts upon each change in level. The image pulse designated A is passed to the circuit at a point in time at which there is a stable transport direction. The stable transport direction is indicated by the signal levels of the signals in lines c) and d). In this example, the signal FW has a logic "high" level and the signal REV has a logic "low" level. The incoming image pulse BP is directly applied as a counting pulse ZP to the image counter. The image pulse designated C is passed to the circuit at a point in time at which there is no stable transport direction. The presence of an unstable transport direction is indicated by both the signal FW and the signal REV having a logic "low" level. The unstable transport direction is generated by the short "low" pulse of the signal DIR in line b), which occurs immediately before the image pulse BP designated C. After the short pulse, the signal DIR again has the previously applied level. This reveals that the transport direction has not changed. The image pulse designated C is buffer-stored in a buffer memory and is applied as a counting pulse to the image counter as soon as there is a stable transport direction again. The image pulse designated B1 is passed to the circuit at a point in time at which there is no stable transport direction. Immediately after the image pulse has been passed to the circuit, three further image pulses are applied to the circuit. The image pulse B2 which arrives immediately after the image pulse designated B1 was generated, for example, because the transport direction is now reversed. The direction signal DIR is not applied in a stable manner, for example because the average speed of the medium close to the change in direction is very low and has parasitic oscillations superimposed on it. The image pulse designated B1 triggered the dead time circuit. The two signals which indicate a stable transport direction both have a logic "low" level on account of the change in the transport direction. As a result, the counters which indicate a stable transport direction are reset. Since sufficient transport pulses have not yet been counted in one direction, there is still no signal which indicates a stable transport direction. The image pulse B2 which then arrives and would cancel the previously counted image pulse B1 again is therefore not passed as a counting pulse ZP to the image counter. The further course of line e) illustrates further image pulses which are triggered by renewed changes in direction. Since there was still no stable transport direction for the two pulses, they are not passed as counting pulses to the image counter. Nevertheless, a further counting pulse is generated, which cancels the counting pulse B1 that was generated shortly before the first change in direction.

The invention was described above with reference to transport pulses which correspond to the transport of the tape-like medium over a defined distance. However, the invention can also be applied to transport pulses which are applied at defined temporal intervals. Furthermore, in the sense of the invention, it is irrelevant whether the signal DIR which indicates the direction is derived from the signal TP containing the transport pulses. The direction signal DIR used in the above description may be derived from the transport pulses TP in a known manner but may also be supplied to the circuit as a separate signal.

The term image counter BZ is used in the foregoing specification only as a synonym for a counter counting a predetermined multiple of a defined distance. In this case the defined distance corresponds to the transport pulses TP, a predetermined multiple of which corresponds to the transport length of one image.

The invention claimed is:

1. A method for determining the position of a tape-like medium which can be moved to and fro along its longitudinal axis, wherein a detector generates first signals which correspond to the transport of the tape-like medium over a defined distance, and wherein a second signal indicates a transport direction, and wherein a third signal indicates the transport of the tape-like medium over a multiple of the defined distance, and wherein the position is determined using multiples of the defined distance, wherein the method comprises the steps of:
  establishing whether the transport direction is constant and defined during a defined period of time or over a defined distance, and generating a fourth signal which indicates a constant and defined transport direction;
  applying the incoming third signal as a counting signal to a counter when the transport direction has been constant for a defined period of time or a defined distance, the fourth signal determining whether the counter is incremented or decremented.

2. The method of claim 1, further comprising the steps of: storing the fourth signal.

3. The method of claim 2, further comprising the steps of:
  blocking further incoming third signals if, during a defined amount of time or within a defined distance after a third signal has been applied as a counting signal to the counter, the second signal changes or is undefined;
  applying a counting signal to the counter when the transport direction is constant again but is opposite to the stored transport direction, wherein the fourth signal determines whether the counter is incremented or decremented.

4. The method of claim 2, further comprising the steps of:
  buffer-storing an incoming third signal when the transport direction is unknown or if, after a change in the transport direction, the period of time or the distance does not suffice to establish a constant transport direction;
  applying the buffer-stored third signal as a counting signal to the counter when the transport direction is constant again and is identical to the stored transport direction, the transport direction determining whether the counter is incremented or decremented.

5. The method of claim 1, wherein the second signal is derived from the first signals which are emitted by the detector.

6. An apparatus for determining the position of a tape-like medium which can be moved to and fro along its longitudinal axis, wherein a detector generates first signals which correspond to the transport of the tape-like medium over a defined distance, and wherein a second signal which indicates the transport direction is supplied to the circuit, wherein the first signals, which are emitted by the detector, and the second signal are supplied to a counting circuit, the counting circuit emitting a fourth signal which indicates a transport direction which has been constant for a defined amount of time or over a defined distance and that a memory is provided which stores the fourth signal.

7. The apparatus of claim 6 wherein third signals, which are supplied to the apparatus, are logically combined with the fourth signal in such a manner that they are not passed to a counter until the transport direction has been constant for a defined period of time or over a defined distance.

8. The apparatus of claim 6, wherein provision is made of a blocking counter which is reset if, within a defined distance or a defined amount of time after a third signal has been applied as a counting signal to the counter, the transport direction changes or is undefined, and the output signal of said blocking counter is logically combined with third signals, which are supplied to the circuit, in such a manner that they are not passed to the counter as counting signals.

9. The apparatus of claim 7, wherein provision is made of a memory which stores the third signal, which is passed to the circuit while the blocking counter is blocking the application of third signals as counting signals to the counter, and which applies the stored third signal as a counting signal to the counter when the blocking counter no longer blocks the application of counting signals to the counter and the constant transport direction is the same as before blocking.

10. The apparatus of claim 7, wherein provision is made of a correction circuit which applies blocked third signals incoming during blocking to the counter, if the constant transport direction at the end of blocking is opposite to the constant transport direction before blocking.

* * * * *